United States Patent
Johnson et al.

(10) Patent No.: US 10,133,617 B2
(45) Date of Patent: Nov. 20, 2018

(54) FAILURE NOTIFICATIONS IN MULTI-NODE CLUSTERS

(71) Applicant: Hewlett Packard Enterprise Development LP, Houston, TX (US)

(72) Inventors: Charles Stuart Johnson, San Jose, CA (US); Tuan Tran, Palo Alto, CA (US); Harumi Kuno, Cupertino, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 117 days.

(21) Appl. No.: 15/200,384

(22) Filed: Jul. 1, 2016

(65) Prior Publication Data
US 2018/0004590 A1    Jan. 4, 2018

(51) Int. Cl.
*G06F 11/00* (2006.01)
*G06F 11/07* (2006.01)

(52) U.S. Cl.
CPC ........ *G06F 11/0772* (2013.01); *G06F 11/079* (2013.01); *G06F 11/0709* (2013.01); *G06F 11/0751* (2013.01)

(58) Field of Classification Search
CPC ............. G06F 11/0772; G06F 11/0709; G06F 11/0751; G06F 11/079; G06F 11/0766; G06F 9/485; G06F 9/4856; G06F 2009/45575
See application file for complete search history.

(56) References Cited

U.S. PATENT DOCUMENTS 5,809,532 A    9/1998 Eno et al.
5,893,149 A    4/1999 Hagersten et al.
6,105,122 A *  8/2000 Muller .................... G06F 15/17
                                                345/472
6,247,077 B1 * 6/2001 Muller .............. G06F 15/17375
                                                710/74
6,675,316 B1 * 1/2004 Harper ................. G06F 11/203
                                                711/135

(Continued)

FOREIGN PATENT DOCUMENTS

WO    WO-2015/122880    8/2015

OTHER PUBLICATIONS

Lombard, P. et al., "A Freeze/Unfreeze Mechanism for the Linuxthreads Library", (Research Paper), 2001, pp. 84-88.

*Primary Examiner* — Bryce P Bonzo
*Assistant Examiner* — Anthony J Amoroso
(74) *Attorney, Agent, or Firm* — Hewlett Packard Enterprise Patent Department

(57) ABSTRACT

Examples include a system comprising a non-volatile memory, a cluster management interface, and a multi-node cluster. In some examples, the cluster management interface may monitor a system critical alert to determine if the system critical alert has been triggered. Based on the determination that it has been triggered, the cluster management interface may multicast a system failure notification. The multi-node cluster of the system has multiple nodes, each node connected to the non-volatile memory and having a processor and a processor cache. Each node of the multi-node cluster may determine if the system failure notification has been received and based on the determination that it has been received, each node may freeze execution of all processes on the process and flush the processor cache to the non-volatile memory.

19 Claims, 6 Drawing Sheets

(56) References Cited

U.S. PATENT DOCUMENTS

| | | | |
|---|---|---|---|
| 6,751,747 B2* | 6/2004 | Li | H04L 12/66 |
| | | | 713/163 |
| 8,209,568 B2* | 6/2012 | Marowsky-Bree | G06F 11/1415 |
| | | | 714/48 |
| 8,516,210 B2 | 8/2013 | Buragohain et al. | |
| 9,753,797 B1* | 9/2017 | Higgins | G06F 11/0772 |
| 2002/0116669 A1* | 8/2002 | Jain | H04L 45/00 |
| | | | 714/43 |
| 2005/0083834 A1* | 4/2005 | Dunagan | G06F 11/0709 |
| | | | 370/221 |

* cited by examiner

FAILURE NOTIFICATIONS IN MULTI-NODE CLUSTERS

BACKGROUND

Computer systems are increasingly expected to process and store larger amounts of data in shorter amounts of time, giving rise, in some examples, to ever larger computer systems. These systems may comprise multiple nodes and large amounts of both volatile and non-volatile memory. While non-volatile memory persists even in the absence of power, volatile memory is maintained only so long as the storage device receives power. Because large computer systems may have a proportionally large amount of volatile memory, a fault or failure affecting volatile memory may severely compromise or affect the system.

BRIEF DESCRIPTION OF THE DRAWINGS

The following detailed description references the drawings, wherein.

DETAILED DESCRIPTION

Figure 1:
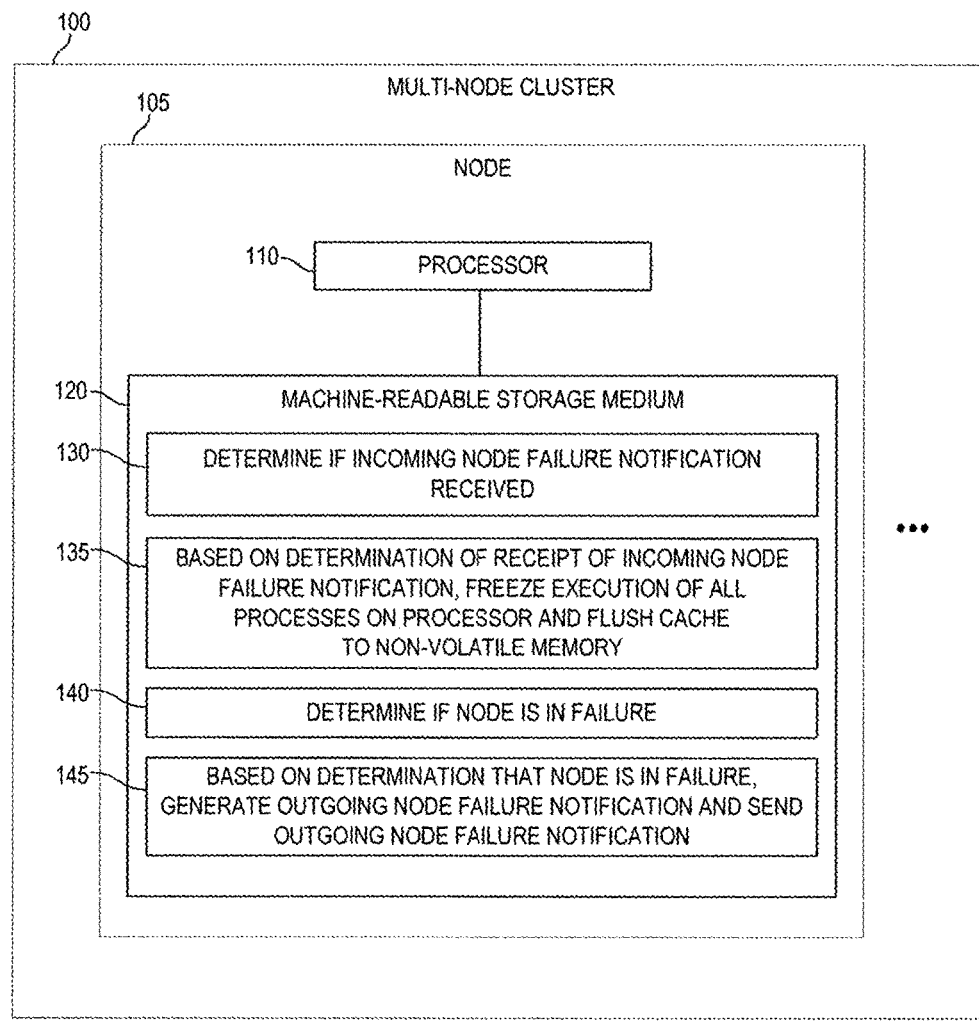
FIG. 1 is a block diagram of an example node in a multi-node cluster having a machine-readable storage medium including instructions to determine if an incoming node failure notification has been received, and based on receipt, freeze all processes and flush a cache to non-volatile memory.

Computer systems may rely on a large amount of volatile and non-volatile memory to quickly and efficiently process and store data in a reliable manner. Volatile memory, such as cache memory, may allow for relatively fast memory accesses, but is not persistent. Thus, data may not be maintained when the storage device does not receive power. Non-volatile memory, on the other hand, may involve relatively slower memory access, but is persistent. Thus, data may be maintained regardless of whether the storage device receives power or not. As computer systems expand, fault tolerant processes and error recovery systems may be used to ensure a functional and durable system.

In some examples, a system may periodically back-up all non-volatile memory. If a fault or failure occurs in such a system, recovery may be attempted using the most recent back-up. However, such a system may be unable to recover any data after the last back-up. Some systems may employ high availability nodes with data redundancy to attempt recovery after a fault along the particular fault line. But these systems may be unable to account for a catastrophic outage, such as a system-wide power failure or a disastrous outage following a natural disaster.

In yet other examples, a system may attempt to address failures by employing a heartbeat, in which each node in the system emits a heartbeat that is suspended if the node is in failure. In such a system, other nodes may "listen" for the heartbeat. If the heartbeat is not heard for a predetermined number of milliseconds or seconds, the node may be declared failed, initiating some recovery process. Recovery, in some examples, may involve an attempt to flush any non-persistent data to persistent storage on a node-by-node or application-by-application basis. But such recovery may be impossible, incomplete, and/or ineffective given that any recovery process may be delayed for several milliseconds or even seconds after a node has initially failed and given that persisting all non-persistent data system-wide on a node-by-node or application-by-application basis may take several minutes or even hours. Such systems may be unable to effectively handle a system-wide failure or a system critical failure within a node.

Examples described herein may allow for a node to send its own failure to each node within a system, resulting in a system-wide freeze and, in some examples, a flush of all non-persistent data to persistent storage. Examples described herein may also allow for monitoring of a system critical alert to send a system-wide system failure notification, resulting in a system-wide freeze, and in some examples, a flush of all non-persistent data to persistent storage.

In some examples described herein, a node of a multi-node cluster may comprise a processor and a machine-readable storage medium encoded with instructions executable by the processor to determine if an incoming node failure notification, indicating that another node within the multi-node cluster is in failure, has been received. Based on the determination that the incoming node failure notification has been received, all processes on the processor may be frozen and a cache on the node may be flushed to non-volatile memory. The storage medium may further comprise instructions to determine if the node is in failure, and based on a determination that the node is in failure, an outgoing node failure notification may be generated and sent to each node within the multi-node cluster. In some examples, based on the determination that the node is in failure, the node may freeze execution of all processes on the processor and flush the cache to non-volatile memory. In examples described herein, a determination, action, etc., that is said to be based on a given condition may be based on that condition alone or based on that condition and other condition(s).

In some examples described herein, a method of a node of a multi-node cluster may involve determining if an incoming node failure notification has been received from another node of the multi-node cluster. The incoming node failure notification may indicate that another node of the multi-node cluster is in failure. The method may further involve determining if a system failure notification has been received from a cluster management interface. The system failure notification may indicate that a system critical alert has been triggered. The method may also involve determining if the node is in failure, and based on the determination that the node is in failure, generating an outgoing node failure notification and sending the outgoing node failure notification to each node in the multi-node cluster. Based on one of the determination that the node is in failure, the determination that an incoming node failure notification has been received, and the determination that a system failure notification has been received, the node may freeze execution of all processes on a processor on the node and flush a cache on the node to a non-volatile memory.

In some examples described herein, a system may comprise a non-volatile memory, a cluster management interface, and a multi-node cluster. The cluster management interface may monitor a system critical alert to determine if the system critical alert has been triggered and, based on a determination that the system critical alert has been triggered, the multi-node cluster may multicast a system failure notification. Each node of the multi-node cluster may be connected to the non-volatile memory and may include a processor and a processor cache. Each node of the multi-node cluster may further determine if the system failure notification has been received from the cluster management interface and, based on a determination that the system failure notification has been received, may freeze execution of all processes on the processor.

In some examples described herein, based on the determination that the system failure notification has been received, each node of the multi-node cluster within the system may also flush the processor cache to the non-volatile memory. Each node may further determine if the node is in failure and, based on the determination that the node is in failure, may multicast an outgoing node failure notification to each node of the multi-node cluster, may freeze all processes on the node, and may flush the processor cache to the non-volatile memory. Each node of the multi-node cluster may further determine if an incoming node failure notification has been received and, based on the determination that the incoming node failure notification has been received, may freeze all processes on the node and flush the processor cache to the non-volatile memory.

Referring now to the drawings, FIG. 1 is a block diagram of an example node 105 in a multi-node cluster 100 having a machine-readable storage medium 120 including instructions to determine if an incoming node failure notification has been received and to generate an outgoing node failure notification based on a determination that the node is in failure. A multi-node cluster, as described herein, may refer to multiple nodes that work together as a single system. In some examples, each node of the multi-node cluster may utilize a same operating system configuration and a same or similar hardware configuration. In other examples, nodes of the multi-node cluster may utilize differing operating system configurations or differing hardware configurations. A node may be any networking or computing device suitable for execution of the functionality described below. As used herein, a node may be a desktop computer, laptop (or notebook) computer, workstation, tablet computer, smart device, switch, router, server, blade enclosure, or any other processing device or equipment including a processor. Although a single node 105 is illustrated in the example of FIG. 1, multi-node cluster 100 may comprise any number of suitable nodes.

Node 105 includes processor 110. As used herein, a processor may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof. In examples described herein, processor 110 may include, for example, one processor or multiple processors included in a single node or distributed across multiple nodes. Processor 110 may fetch, decode, and execute instructions stored on storage medium 120 to perform the functionalities described below in relation to instructions 130, 135, 140, and 145. In other examples, the functionalities of any of the instructions of storage medium 120 may be implemented in the form of electronic circuitry, in the form of executable instructions encoded on a machine-readable storage medium, or a combination thereof.

As depicted in FIG. 1, node 105 may also include a machine-readable storage medium 120 comprising (e.g., encoded with) instructions 130, 135, 140, and 145 executable by processor 110 to implement functionalities described herein in relation to FIG. 1. In some examples, storage medium 120 may include additional instructions. In other examples, the functionalities described herein in relation to instructions 130, 135, 140, and 145, and any additional instructions described herein in relation to storage medium 120, may be implemented at least in part in electronic circuitry (e.g., via components comprising any combination of hardware and programming to implement the functionalities described herein).

As used herein, a machine-readable storage medium may be any electronic, magnetic, optimal, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In the example of FIG. 1, storage medium 120 may be implemented by one machine-readable storage medium, or multiple machine-readable storage media.

Instructions 130 may determine if an incoming node failure notification has been received at node 105. The incoming node failure notification may indicate that another node of multi-node cluster 100 (e.g., a node other than node 105) is in failure. As used herein, an incoming node failure notification may refer to a notification that is received by a node (e.g., node 105) and indicates that another node is in failure. The incoming node failure notification may be a message, a flag, or the like. A node may fail for a variety of reasons, including faulty electronic circuitry and components, overloading due to inadequate resources and/or too high a load, overheating, a broken network, faulty processes or instructions, security breach and/or virus infection.

In some examples, the incoming node failure notification may be received at node 105 via a multicast address associated with node 105. In some such examples, each node of multi-node cluster 100 may be part of a multicast group associated with a multicast address. In other examples, some, but not all nodes within multi-node cluster 100 may be part of the multicast group associated with the multicast address. A multicast protocol may allow for a single message or a single copy of data to be sent to the multicast address and distributed to the multicast group. Multicasting the incoming node failure notification may also involve sending the notification to a global fabric address that various clusters or individual nodes may subscribe to monitor as a cluster mailbox, an interrupt vector, or other fabric-based watchdog function that drives a fabric-based response. In other examples, the incoming node failure notification may be unicast or broadcast to node 105.

Based (at least in part) on the determination that the incoming node failure notification has been received, instructions 135 may freeze execution of all processes on processor 110 of node 105. In some examples, instructions 135 may assert a freeze command to freeze execution of processes. A freeze, as used herein, may refer to halting execution of a process to preserve the state of the node. A process, as used herein, may refer to an instruction, operation, transaction, or task. In some examples, a freeze may involve halting a process at an interruptible portion designated to accept interrupts. For example, a freeze may involve halting a transaction at an interface or port of a component such that the transaction does not cross the interface or port. In one such example, a freeze may prevent data in a write buffer from being written to storage in response to a write transaction. In other examples, a freeze may involve halting execution of a process immediately, regardless of whether the process may be at a designated interruptible portion.

Instructions 135 may also flush a cache of node 105 to non-volatile memory. A cache, as used herein, may refer to a fast, volatile memory to store copies of data that has been recently accessed or may be frequently accessed. The cache of node 105 may include a processor cache, a translation lookaside buffer, and/or other data and instruction caches. In some examples, a processor cache may have multiple levels of cache. In some such examples, a processor may have three levels of cache, a level one (l1) cache, a level two (l2) cache, and a level three (l3) cache. The level one cache may be the fastest as well as the smallest cache. The level two cache may be larger, but may also be slower than the level one cache and the level three cache may be the largest of the three caches, but may also the slowest. In other examples, a processor may have greater or fewer levels of cache of varying sizes and speeds, depending on the system.

Flush, as used in the examples herein, may refer to a transfer of data from a temporary or non-persistent storage to a permanent or persistent storage. In some examples, flushing cache to non-volatile memory may refer to writing or copying all data from cache to non-volatile memory. In such examples, each cache-line may be written to non-volatile memory via a memory channel, memory fabric, or the like. Non-volatile memory, as used herein, may refer to any persistent storage apparatus to contain or store information. For example, non-volatile memory may be any of flash memory, a storage drive (e.g., a hard drive), a solid state drive, any type of storage disc (e.g., a compact disc, a DVD, etc.), any byte addressable non-volatile memory, such as memristor, phase change, spin torque transfer, and the like, or a combination thereof. In some examples, non-volatile memory may include fabric-attached memory shared by all nodes or a subset of nodes within a multi-node cluster. In other examples, non-volatile memory may also refer to battery-backed dynamic random access memory (DRAM) or other types of battery-backed volatile memories.

Together, freeze and flush may capture a snapshot of the state of the running node such that the node may be restarted, debugged, or otherwise analyzed. The purpose of the freeze and flush may determine what is frozen and/or flushed. For example, freezing and flushing in some debugging scenarios may involve freezing all processes on the processor and flushing all non-persistent memory, including cache, registers, memory buffers, instruction pipeline states, and the like. In some examples, freeze may be used alone to preserve the state of the node without flushing cache to storage. In some such examples, freeze may halt execution of processes at a particular moment in time for certain debugging scenarios.

In the example of FIG. 1, instructions 140 may determine if node 105 is in failure. As discussed above, a node may fail for a variety of reasons. In some examples, instructions 140 may monitor a critical process within node 105 to determine if node 105 is in failure. In other examples, instructions 140 may monitor a sensor, an alert, a notification, and/or an error to determine if node 105 is in failure. In yet other examples, instructions 140 may receive an alert, notification, or error from within node 105. Instructions 140 may rely on any combination of monitoring processes, sensors, alerts, notifications, and/or errors and receiving alerts, notifications, messages, and/or errors to determine if node 105 is in failure. In some examples, certain processes, components, or other devices within node 105 may be designated as system critical such that their failure results in a determination by node 105 that it is in failure.

Based (at least in part) on the determination that node 105 is in failure, instructions 145 may generate an outgoing node failure notification. The outgoing node failure notification may indicate that node 105 of multi-node cluster 100 is in failure. As used herein, an outgoing node failure notification may refer to a notification that is generated by a node and indicates that it is in failure. The outgoing node failure notification may be a message, a flag, or other communication. An outgoing node failure notification is received as an incoming node failure notification at nodes within multi-node cluster 100 other than node 105.

Instructions 145 may further send the outgoing node failure notification to each node in multi-node cluster 100. In some examples, the outgoing node failure notification may be sent to a multicast address that distributes the notification to each node within multi-node cluster 100. In other examples, outgoing node failure notification may be multicast to a subset of nodes within multi-node cluster 100. In yet other examples, the outgoing node failure notification may be unicast or broadcast to some or all nodes within multi-node cluster 100. Node 105 may communicate with other nodes within multi-node cluster 100 via a computer network (e.g., Internet, Local Area Network (LAN), Wide Area Network (WAN), etc.) and/or dedicated or shared communication links, lines, buses, or memory fabric. In some examples, the outgoing node failure notification may be received as an incoming node failure notification at each node in multi-node cluster 100 within a millisecond of the determination by node 105 that it is in failure.

Sending the outgoing node failure notification to each node within multi-node cluster 100 upon determination of the failure of a single node 105 may allow for the system-wide globalization of a local event. In some examples, where the local event (e.g., failure of a node due to failure of a critical process) may infect or spread to other nodes within multi-node cluster 100, globalization of the event may allow for timely preservation of data.

In some examples, instructions 130, 135, 140, and 145 may be part of an installation package that, when installed, may be executed by processor 110 to implement the functionalities described above. In such examples, storage medium 120 may be a portable medium, such as a CD, DVD, or flash drive, or a memory maintained by a server from which the installation package can be downloaded and installed. In other examples, instructions 130, 135, 140, and 145 may be part of an application, applications, or component(s) already installed on node 105 including processor 110. In such examples, the storage medium 120 may include a memory such as a hard drive, solid state drive, or the like. In some examples, functionalities described herein in relation to FIG. 1 may be provided in combination with functionalities described herein in relation to any of FIGS. 2-6.

Figure 2:
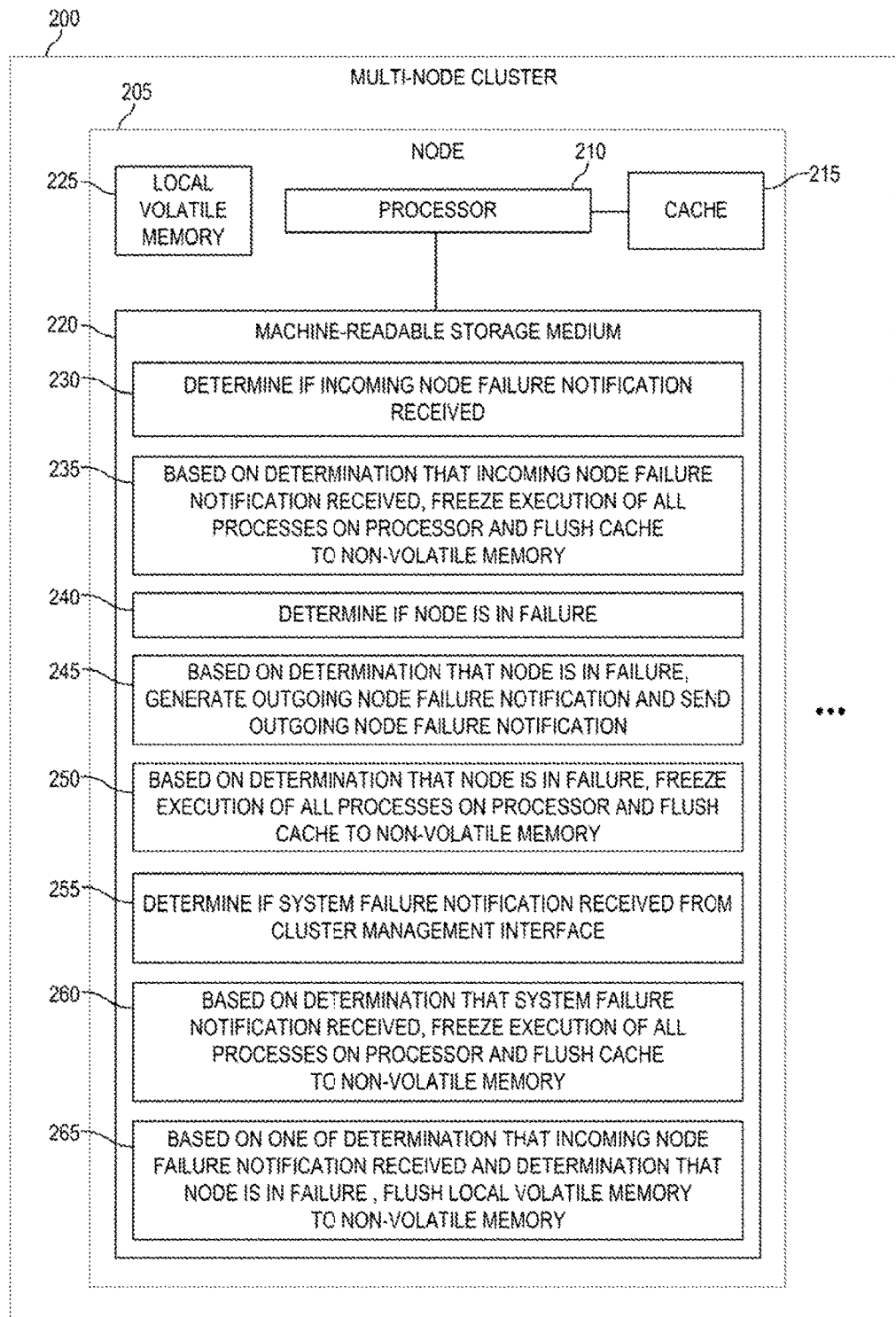
FIG. 2 is a block diagram of an example node in a multi-node cluster having a machine-readable storage medium including instructions to determine if a node is in failure, and based on the determination, generate and multicast an outgoing node failure notification.

Further examples are described herein in relation to FIG. 2, which is a block diagram of an example, multi-node cluster 200 having a node 205, a processor 210, a cache 215, a local volatile memory 225, and a machine-readable storage medium 220 that includes instructions to determine if a system failure notification has been received from a cluster management interface and, if so, freeze execution of all processes on processor 210 and flush cache 215 to non-volatile memory.

As depicted in FIG. 2, node 205 may include a machine-readable storage medium 220 comprising (e.g., encoded with) instructions 230, 235, 240, 245, 250, 255, 260, and 265 executable by processor 210 to implement functionalities described herein in relation to FIG. 2. In some examples, storage medium 220 may include additional instructions. In other examples, the functionalities described herein in relation to instructions 230, 235, 240, 245, 250, 255, 260, 265, and any additional instructions described herein in relation to storage medium 220, may be implemented at least in part in electronic circuitry (e.g., via components comprising any combination of hardware and programming to implement the functionalities described herein).

Processor 210 may fetch, decode, and execute instructions stored on storage medium 220 to perform the functionalities described above in relation to instructions 230, 235, 240, 245, 250, 255, 260, and 265. In other examples, the functionalities of any of the instructions of storage medium 220 may be implemented in the form of electronic circuitry, in the form of executable instructions encoded on a machine-readable storage medium, or a combination thereof. In the example of FIG. 2, storage medium 220 may be implemented by one machine-readable storage medium, or multiple machine-readable storage media.

Instructions 230 of FIG. 2 may determine if an incoming node failure notification has been received, as described above in relation to instructions 130 of FIG. 1. Based on the determination that the incoming node failure notification has been received, instructions 235 may freeze execution of all processes on processor 210 of node 205 and flush cache 215 to non-volatile memory, as described above in relation to instructions 135 of FIG. 1. Instructions 240 may determine if node 205 is in failure, as described above in relation to instructions 140 of FIG. 1. Based on the determination that node 205 is in failure, instructions 245 may generate an outgoing node failure notification and send the outgoing node failure notification to each node in multi-node cluster 200, as described above in relation to instructions 145 of FIG. 1.

Based on the determination that node 205 is in failure, instructions 250 may additionally freeze execution of all processes on processor 210 of node 205 and flush cache 215 to non-volatile memory. As described above in relation to instructions 135 of FIG. 1, in some examples, instructions 250 may freeze execution of all processes on processor 210 by asserting a freeze command to freeze execution of processes. A freeze may involve halting a process at an interruptible portion designated to accept interrupts. For example, a freeze may involve halting a transaction at an interface or port of a component such that the transaction does not cross the interface or port. In one such example, a freeze may prevent data in a write buffer from being written to storage in response to a write transaction. In other examples, a freeze may involve halting execution of a process immediately, regardless of whether the process may be at a designated interruptible portion.

Instructions 250 may also flush cache 215 to non-volatile memory, as described above in relation to instructions 135 of FIG. 1. In some examples, flushing cache to non-volatile memory may refer to writing or copying all data from cache to non-volatile memory. In such examples, each cache-line may be written to non-volatile memory via a memory channel, memory fabric, or the like.

Together, freeze and flush may capture a snapshot of the state of the running node such that the node may be restarted, debugged, or otherwise analyzed. In some examples, freeze may be used alone to preserve the state of the node without flushing cache to storage. In some such examples, freeze may halt execution of processes at a particular moment in time for debugging purposes.

Instructions 255 may determine if a system failure notification has been received from a cluster management interface. As used herein, a system failure notification may refer to a notification that indicates that a system critical alert has been triggered. In examples described herein, a system critical alert may refer to an alert or process that indicates a failure (i.e., failing or will fail shortly) of a system critical process, component, or device which resides within multi-node cluster 200. In some examples, a system critical alert may comprise a non-maskable interrupt (NMI) and/or an outage alert.

In the examples described herein, an NMI may refer to a hardware interrupt that standard interrupt masking techniques within a system may not ignore. An outage alert, as used herein, may indicate a system critical outage. In some examples, the outage alert may indicate a power outage, network outage, or an outage due to a natural disaster. In some such examples, the outage alert may comprise a power failure alert to indicate the power outage and/or a disaster alert to indicate an earthquake, tsunami, fire, or other event that may result in a catastrophic failure of the system.

A system may fail for a variety of reasons, including faulty electronic circuitry and components, a broken network, faulty processes or instructions, security breach, virus infection, power failure, natural disaster, and the like. The system failure notification may be a message, a flag, or other communication from a cluster management interface. A cluster management interface, as used herein, may refer to an interface associated with a multi-node cluster that sends a system failure notification to components within a system. The cluster management interface may be distributed or centralized and may monitor system critical alerts, including system critical processes, to determine if a system is in failure.

In some examples, the system failure notification may be received via a multicast address associated with node 205. In some such examples, each node of multi-node cluster 200 may be part of a multicast group associated with a multicast address. A multicast protocol may allow for a single message or a single copy of data to be sent to the multicast address and distributed to the multicast group. Multicasting the incoming node failure notification may also involve sending the notification to a global fabric address that various clusters or individual nodes may subscribe to monitor as a cluster mailbox, an interrupt vector, or other fabric-based watchdog function that drives a fabric-based response. In other examples, the system failure notification may be unicast or broadcast to node 205.

Based on the determination that the system failure notification has been received at node 205, instructions 260 may freeze all processes on processor 210 of node 205 and flush cache 215 to non-volatile memory, as described above in relation to instructions 250 of FIG. 2 and instructions 135 of FIG. 1. Based on one of the determinations that the incoming node failure notification has been received and the determination that node 205 is in failure, instructions 265 may also flush a local volatile memory on node 205 to non-volatile memory. Local volatile memory, as used herein, may refer to non-cache, non-persistent memory on node 205. Local memory may include any of dynamic random access memory (DRAM), static random access memory (SRAM), and other types of non-persistent storage. In some examples, node 205 may share a fabric attached non-volatile memory (e.g., FLASH) with the nodes in multi-node cluster 200, but may not share a local, private memory (e.g., DRAM) on node 205 with other nodes. In other examples, node 205 may include both non-volatile memory and local, volatile memory on node 205. In yet other examples, local volatile memory on node 205 may be shared amongst other nodes in multi-node cluster 200.

Instructions 260 may freeze all processes on processor 210 of node 205, as described above in relation to instructions 250 of FIG. 2 and instructions 135 of FIG. 1. Instructions 260 may also flush local volatile memory to 225 of node 205 to non-volatile memory by writing or copying all data from local volatile memory 225 to non-volatile memory. In such examples, local volatile memory 225 may be written or copied to non-volatile memory via a memory channel, memory fabric, or the like.

In some examples, instructions 230, 235, 240, 245, 250, 255, 260, and 265 may be part of an installation package that, when installed, may be executed by processor 110 to implement the functionalities described above. In such examples, storage medium 120 may be a portable medium, such as a CD, DVD, or flash drive, or a memory maintained by a server from which the installation package can be downloaded and installed. In other examples, instructions 230, 235, 240, 245, 250, 255, 260, and 265 may be part of an application, applications, or component(s) already installed on node 205 including processor 210. In such examples, the storage medium 220 may include memory such as a hard drive, solid state drive, or the like. In some examples, functionalities described herein in relation to FIG. 2 may be provided in combination with functionalities described herein in relation to any of FIGS. 1 and 3-6.

Figure 3:
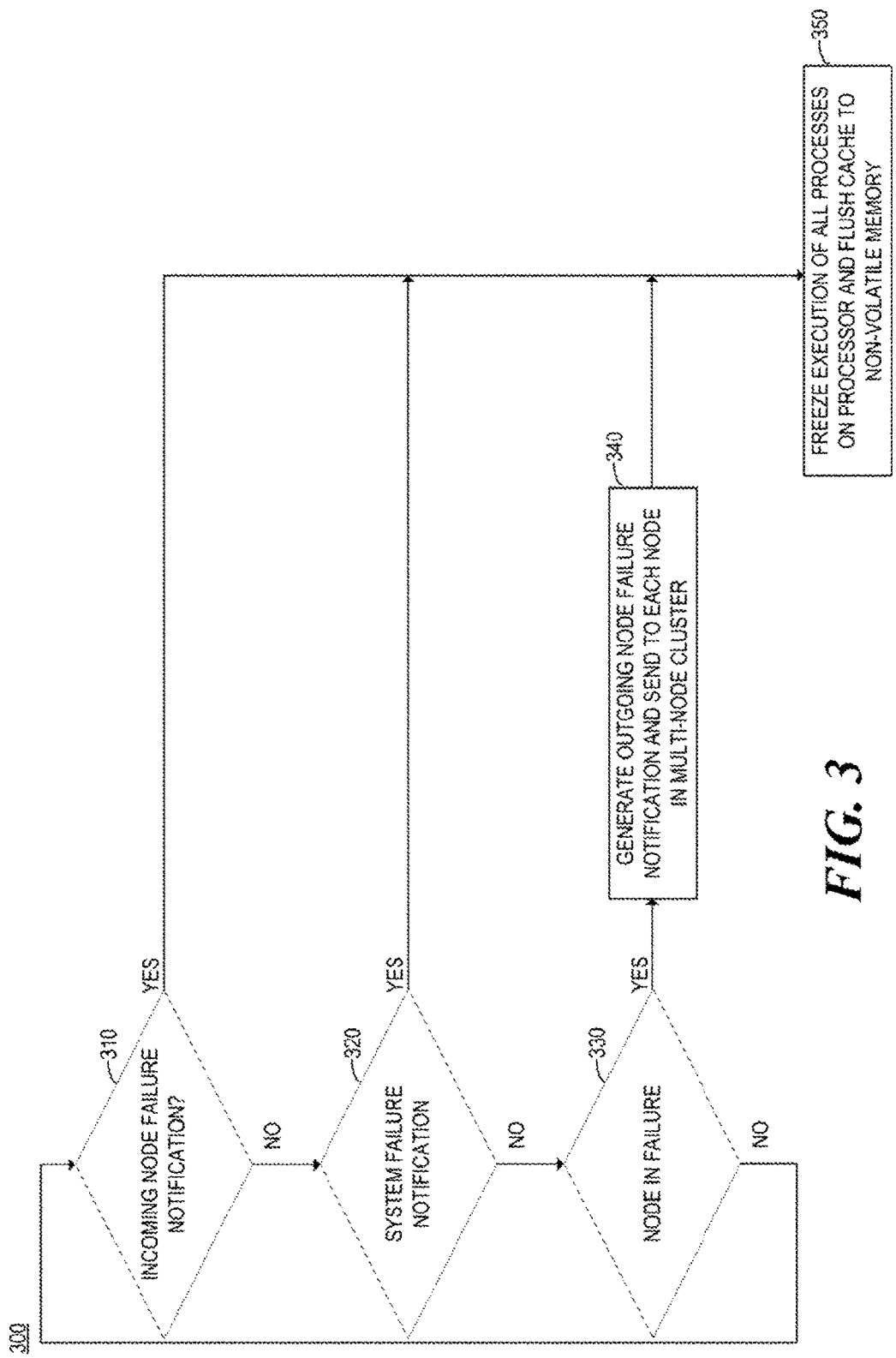
FIG. 3 is a flow chart of an example method for a node in a multi-node cluster including determining whether a node is in failure, a node failure notification has been received, and a system failure notification has been received, and based on the determination, freeze all processes and flush a cache to non-volatile memory.

FIG. 3 is a flowchart of an example method 300 for a node in a multi-node cluster including determining whether an incoming node failure notification has been received, determining whether a system failure notification has been received, determining whether the node is in failure and, based (at least in part), on one of the determinations, freezing execution of all processes on the processor and flushing cache to non-volatile memory. Although execution of method 300 is described below with reference to node 205 in multi-node cluster 200 of FIG. 2, other suitable nodes for the execution of method 300 can be utilized (e.g., node 105 in multi-node cluster 100 of FIG. 1). Additionally, implementation of method 300 is not limited to such examples.

In the example of FIG. 3, method 300 may be a method of node 205. At 310, instructions 230 may determine if an incoming node failure notification has been received. This determination may be performed as described above in relation to instructions 230 of FIG. 2. If the node failure notification has not been received, method 300 may proceed to 320. At 320, instructions 255 may determine if a system failure notification has been received from a cluster management interface. The determination may be performed as described above in relation to instructions 255 of FIG. 2. If the system failure notification has not been received from the cluster management interface, method 300 may proceed to 330. At 330, instructions 240 may determine if node 205 is in failure, as described above in relation to FIG. 2. Based (at least in part) on the determination that node 205 is in failure, method 300 may proceed to 340. At 340, instructions 245 may generate an outgoing node failure notification and send the outgoing node failure notification to each node within multi-node cluster 200, as described above in relation to FIG. 2.

Based (at least in part) on one of the determination that the incoming node failure notification has been received, as described above in relation to instructions 230 of FIG. 2, the determination that the system failure notification has been received, as described above in relation to instructions 255 of FIG. 2, and the determination that node 205 is in failure, as described above in relation to instructions 240 of FIG. 2, method 300 may proceed to 350. At 350, based (at least in part) on one of the determinations, execution of all processes on processor 210 of node 205 may be frozen and cache 215 may be flushed to non-volatile memory. This freezing and flushing may be performed as described above in relation to instructions 235, 250, and 260 of FIG. 2. In some examples, all processes on processor 210 may be frozen to preserve the state of node 205, but cache 215 may not be flushed to non-volatile memory.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1-2 and 4-6.

Figure 4:
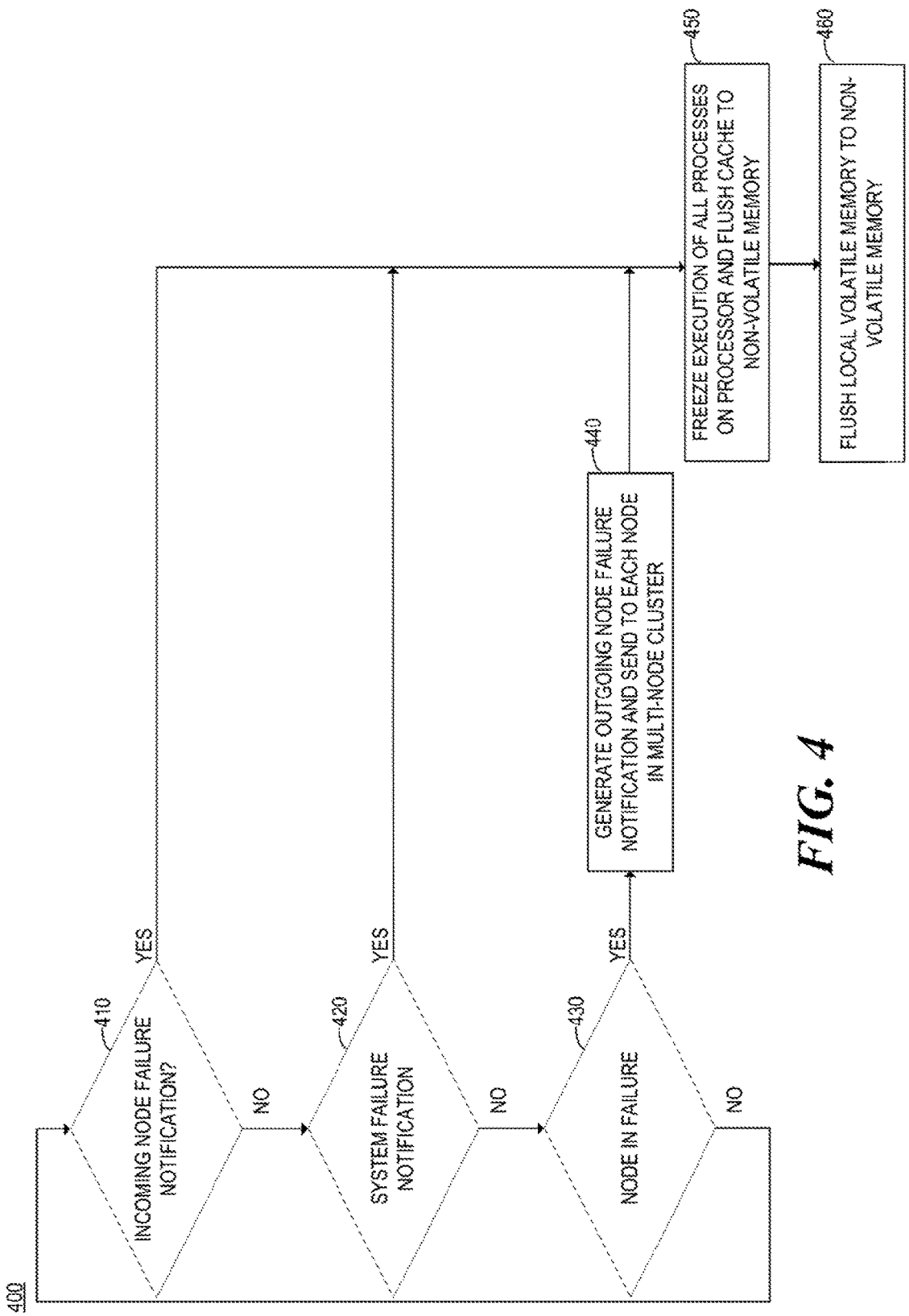
FIG. 4 is a flow chart of an example method for a node in a multi-node cluster including determining whether a node is in failure, a node failure notification has been received, and a system failure notification has been received, and based on the determination, flush local memory to non-volatile memory.

FIG. 4 is a flowchart of an example method 400 for a node in a multi-node cluster including flushing local volatile memory to non-volatile memory. Although execution of method 400 is described below with reference to node 205 in multi-node cluster 200 of FIG. 2, other suitable nodes for the execution of method 400 can be utilized (e.g., node 105 in multi-node cluster 100 of FIG. 1). Additionally, implementation of method 400 is not limited to such examples.

In the example of FIG. 4, method 400 may be a method of node 205. At 410, instructions 230 may determine if an incoming node failure notification has been received. This determination may be performed as described above in relation to instructions 230 of FIG. 2. If the node failure notification has not been received, method 400 may proceed to 320. At 420, instructions 255 may determine if a system failure notification has been received from a cluster management interface. The determination may be performed as described above in relation to instructions 255 of FIG. 2. If the system failure notification has not been received from the cluster management interface, method 400 may proceed to 430. At 430, instructions 240 may determine if node 205 is in failure, as described above in relation to FIG. 2. Based (at least in part) on the determination that node 205 is in failure, method 400 may proceed to 440. At 440, instructions 245 may generate an outgoing node failure notification and multicast the outgoing node failure notification to each node within multi-node cluster 200, as described above in relation to FIG. 2.

Based (at least in part) on one of the determination that the incoming node failure notification has been received, as described above in relation to instructions 230 of FIG. 2, the determination that the system failure notification has been received, as described above in relation to instructions 255 of FIG. 2, and the determination that node 205 is in failure, as described above in relation to instructions 240 of FIG. 2, method 400 may proceed to 450. At 450, based (at least in part) on one of the determinations, execution of all processes on processor 210 may be frozen and cache 215 may be flushed to non-volatile memory. This freezing and flushing may be performed as described above in relation to instructions 235, 250, and 260 of FIG. 2. In some examples, at 460, local volatile memory on node 205 may be flushed to non-volatile memory, as described above in relation to instructions 265 of FIG. 2. In some examples, non-volatile memory may be a fabric-attached memory, whereas local volatile memory may be a non-fabric attached memory on node 205. In some such examples, non-volatile memory may be shared amongst the nodes of multi-node cluster 200, whereas the volatile memory may not. In other examples, node 205 may include both non-volatile memory and local, volatile memory on node 205. In yet other examples, local volatile memory on node 205 may be shared amongst other nodes in multi-node cluster 200.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3 and 5-6.

Figure 5:
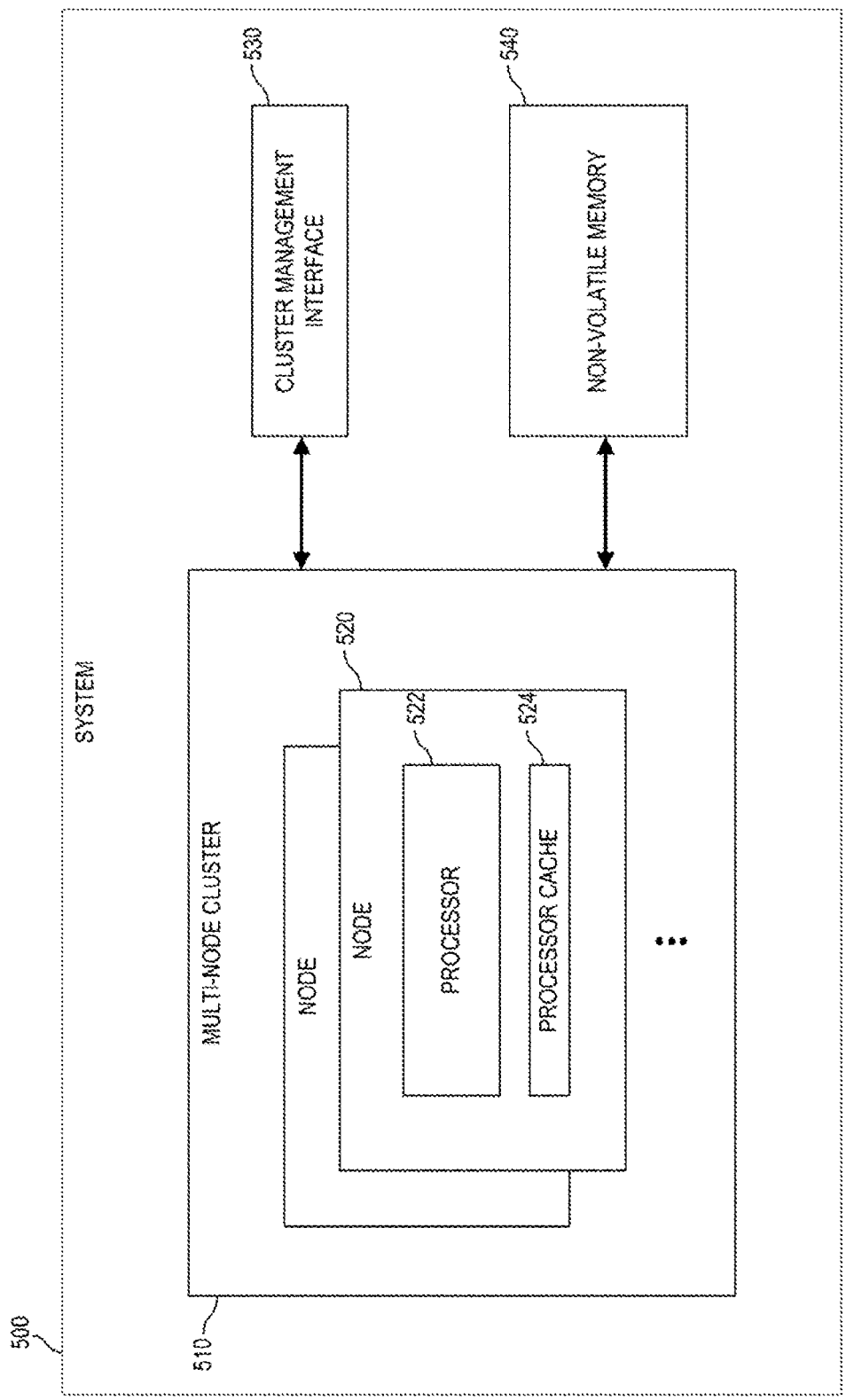
FIG. 5 is a block diagram of an example system that includes a non-volatile memory, a cluster management interface to multicast a system failure notification, and a multi-node cluster to receive the system failure notification and freeze execution of all processes at each node.

Further examples are described in relation to FIG. 5. FIG. 5 is a block diagram of an example system 500 having a non-volatile memory 540, a cluster management interface 530, and multi-node cluster 510. Multi-node cluster 510 further comprises nodes 520 having a processor 522 and a cache 524. Although two nodes 520 are illustrated, multi-node cluster 500 may comprise any number of suitable nodes. In some examples, system 500 may include multiple multi-node clusters 510, though a single multi-node cluster 510 is illustrated in FIG. 5. System 500 may comprise any suitable number of multi-node clusters 510. System 500 is described below with reference to the instructions associated with node 205 in multi-node cluster 200 of FIG. 2, however, other suitable implementations may be used.

Cluster management interface 530 may monitor a system critical alert to determine if the system critical alert has been triggered. As described above, a cluster management interface may refer to an interface associated with a multi-node cluster that sends a system failure notification to components within a system. In some examples, cluster management interface 530 may be associated with multiple multi-node clusters. The cluster management interface may be distributed or centralized and may monitor system critical alerts, including system critical processes, to determine if a system is in failure. A system critical alert may refer to an alert or process that indicates a failure (i.e., failing or will fail shortly) of a system critical process, component, or device in system 500 within which multi-node cluster 510 resides.

In some examples, monitoring a system critical alert may involve determining whether a message, alert, or notification has been received from a system critical process, device, or other entity. In some such examples, a system critical alert may be deemed triggered when a particular message, alert, or notification has been received. In other examples, monitoring a system critical alert may involve identifying when a particular process stops. In yet other examples, monitoring a system critical alert may involve determining the status of a process, device, or other entity. In some such examples, the system critical alert may be deemed triggered when the process, device, or entity has a failing or critical status. Triggering of a system critical alert may indicate that the system will or is likely to fail. In other examples, monitoring a system critical alert may involve listening in on a particular address to determine if a message associated with the system critical alert has been sent. In such examples, the system critical alert may be deemed triggered when the message appears on the address.

Based (at least in part) on a determination that the system critical alert has been triggered, cluster management interface 530 may generate a system failure notification and multicast the system failure notification. The system failure notification may be a message, a flag, or other communication that indicates that a system critical alert has been triggered. In some examples, each node 520 of multi-node cluster 510 may be part of a multicast group associated with a multicast address. In other examples, a subset of nodes 520 may be associated with the multicast address. In yet other examples, cluster management interface 530 may unicast or broadcast the system failure notification to nodes 520. Cluster management interface 530 may communicate with multi-node cluster 510 via a computer network (e.g., Internet, Local Area Network (LAN), Wide Area Network (WAN), etc.) and/or dedicated or shared communication links, lines, or buses. In some examples, the system failure notification may be received at each node 520 in multi-node cluster 510 within a millisecond of a system critical alert being triggered.

System 500 further includes non-volatile memory 540 and multi-node cluster 510. As described above, non-volatile memory may refer to any persistent storage apparatus to contain or store information. Non-volatile memory 540 is connected to each node 520 within multi-node cluster 510 via a memory channel, memory fabric, or other communication link to transfer data and other information. Each node 520 within multi-node cluster 510 also includes a processor 522 and a processor cache 524.

Processor 522 may include, for example, one processor or multiple processors and may perform the functionalities described below via implementation in the form of electronic circuitry and/or by fetching, decoding, and executing instructions encoded on a machine-readable storage medium.

In the examples herein, a processor cache may refer to a cache associated with a processor. In some examples, processor cache 524 may have multiple levels of cache. For example, processor 522 may have three levels of processor cache 524, a level one (l1) cache, a level two (l2) cache, and a level three (l3) cache. The level one cache may be the fastest as well as the smallest cache. The level two cache may be larger, but may also be slower than the level one cache and the level three cache may be the largest of the three caches, but may also the slowest. In other examples, processor 522 may have greater or fewer levels of processor cache of varying sizes and speeds, depending on the system.

Each node 520 of multi-node cluster 510 determines if the system failure notification has been received from cluster management interface 530, as described above in relation to instructions 255 of FIG. 2. Based (at least in part) on the determination that the system failure notification has been received, each node 520 freezes execution of all processes on its processor 522, as described above in relation to instructions 260 of FIG. 2. In some examples, each node 520 may freeze execution of all processes on its processor 522 to preserve the state of the node without flushing to storage. In other examples, each node 520 may freeze execution of all processes on its processor 522 and flush its processor cache 524 to non-volatile memory 540, as described above in relation to instructions 260 of FIG. 2.

Figure 6:
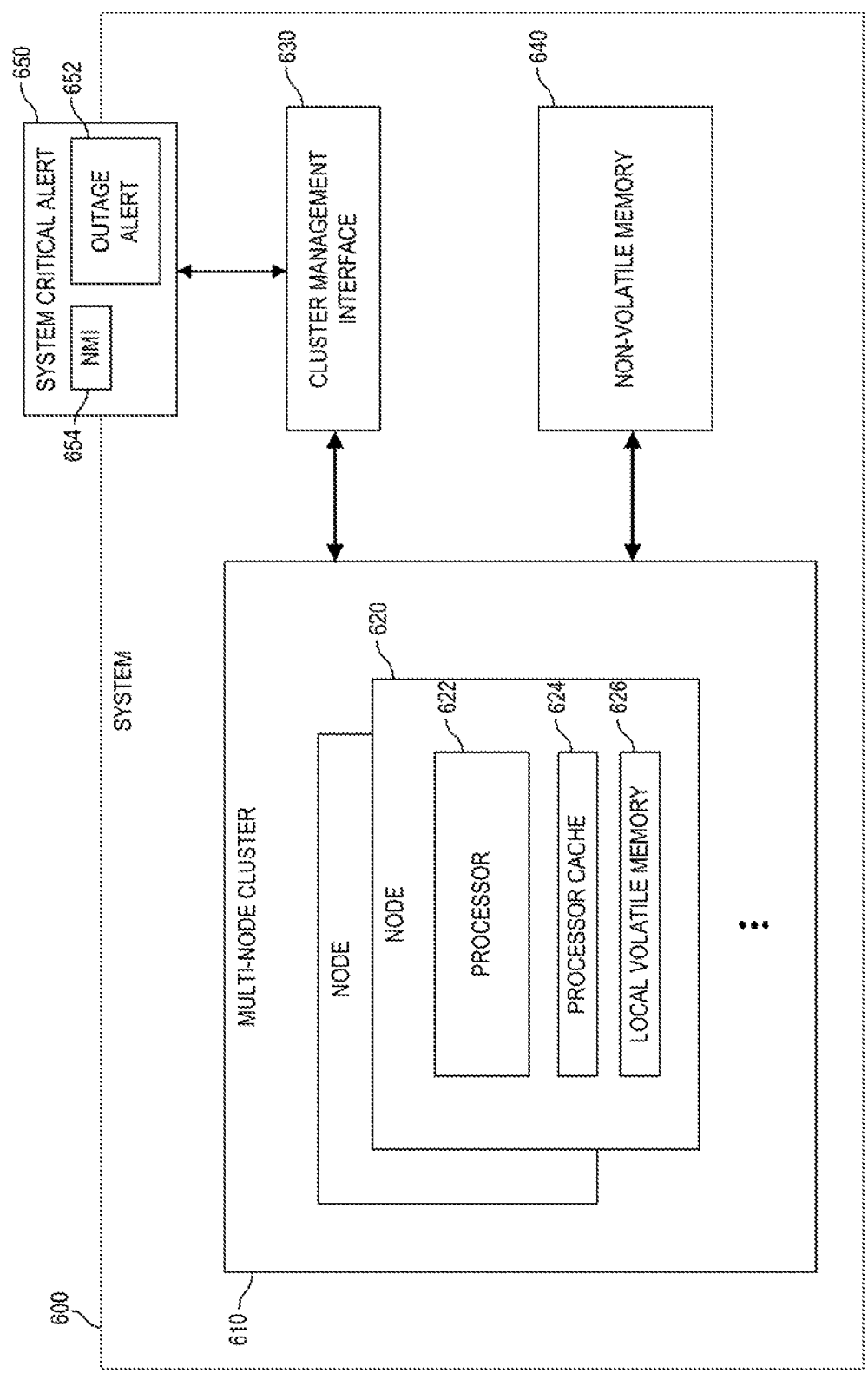
FIG. 6 is a block diagram of an example system that includes a non-volatile memory, a cluster management interface, a multi-node cluster, and a system critical alert comprising a non-maskable interrupt and an outage alert.

FIG. 6 is a block diagram of an example system 600 having a non-volatile memory 640, a cluster management interface 630 to monitor a system critical alert 650, and a multi-node cluster 610. Multi-node cluster 610 further comprises nodes 620 having a processor 622, processor cache 624, and local volatile memory 626. In some examples, non-volatile memory 640 and processor 622 may receive separate power such that a power failure to non-volatile memory 640 may not affect processors 622 on nodes 620 and vice versa. Although two nodes 620 are illustrated, multi-node cluster 600 may comprise any number of suitable nodes. System 600 is described below with reference to the instructions associated with node 205 in multi-node cluster 200 of FIG. 2, however, other suitable implementations may be used.

Cluster management interface 630 of FIG. 6 may monitor a system critical alert 650 to determine if the system critical alert has been triggered, as described above in relation to cluster management interface 530 of FIG. 5. In some examples, system critical alert 650 may comprise a non-maskable interrupt (NMI) 654 and/or an outage alert 652. An NMI, as used herein, may refer to a hardware interrupt that standard interrupt-masking techniques within a system may not ignore. NMI 654 may indicate that a non-recoverable or system critical fault, exception, or error has occurred within system 600. In some such examples, upon receiving NMI 654, cluster management interface 630 may determine that the NMI has been triggered (and thus system critical alert 650 has been triggered) and may generate and multicast a system failure notification, as described above in relation to cluster management interface 530 of FIG. 5.

System critical alert 650 may further comprise an outage alert 652. As described above, outage alert 652 may indicate a system critical power outage, network outage, or natural disaster. In some examples, outage alert 650 may communicate with or monitor, any of a local power grid, a disaster notification/warning system (e.g., earthquake early warning system, tsunami warning system, extreme weather warning system), local police and first responder alerts, and the like.

In some examples, outage alert 652 may send a message, notification, or other alert to cluster management interface 630 to indicate an outage or other high level warning/alert. Based (at least in part) on the receipt of the message, notification, or alert, cluster management interface 630 may determine that system critical alert 650 has been triggered and multicast a system failure notification, as described above in relation to cluster management interface 530 of FIG. 5. In other examples, outage alert 652 may involve a continuously running process that stops when there is (or will be) an outage or other high level warning/alert. In response to the stopping of outage alert 652, cluster management interface 630 may determine that system critical alert 650 has been triggered. In yet other examples, outage alert 652 may set an alert status in response to an outage or other high level warning/alert. Based (at least in part) on the status of outage alert 652, cluster management interface may determine that system critical alert 650 has been triggered. Based (at least in part) on the determination that system critical alert 650 has been triggered, cluster management interface 630 may generate and multicast a system failure notification, as described above in relation to cluster management interface 530 of FIG. 5.

In one example, outage alert 652 may monitor a local or regional power grid and send a notification to cluster management interface 630 when there may be an imminent power failure. Based (at least in part) on the notification, cluster management interface 630 may determine that system critical alert 650 has been triggered, and multicast a system failure notification to some or all of nodes 620 within multi-node cluster 610 indicate an imminent failure to system 600.

System 600, as with system 500, further includes non-volatile memory 640 and multi-node cluster 610. Non-volatile memory 640 is connected to each node 620 within multi-node cluster 610 via a memory channel, memory fabric, or other communication link to transfer data and other information. In some examples, non-volatile memory 640 may comprise fabric-attached memory.

Each node 620 within multi-node cluster 610 also includes a processor 222, a processor cache 624, and a local volatile memory 626. Processor 622, like processor 522 of FIG. 5, may include, for example, one processor or multiple processors and may perform the functionalities described below via implementation in the form of electronic circuitry and/or by fetching, decoding, and executing instructions encoded on a machine-readable storage medium. As with processor cache 524 of FIG. 5, processor cache 624 may have multiple levels of processor cache of varying sizes and speeds, depending on the system. In examples described herein, local volatile memory 626 may refer to non-cache, non-persistent memory on node 626. In some examples, local volatile memory 626 may be non-fabric attached memory. In other examples, local volatile memory 626, like local volatile memory 225 of FIG. 2, may or may not be shared amongst the nodes 620 of multi-node cluster 610.

Each node 620 of multi-node cluster 610 determines if the system failure notification has been received from cluster management interface 630, as described above in relation to instructions 255 of FIG. 2. Based (at least in part) on the determination that the system failure notification has been received, each node 620 may freeze execution of all processes on its processor 622 and flush its processor cache 624 to non-volatile memory 540, as described above in relation to instructions 260 of FIG. 2. Each node 620 also determines if it is in failure, as described above in relation to instructions 240 of FIG. 2. Based (at least in part) on the determination that it is in failure, the failing node may multicast an outgoing node failure notification to each node 620 of multi-node cluster 610, as described above in relation to instructions 245 of FIG. 2. Based also (at least in part) on the determination that it is in failure, the failing node may freeze execution of all processes on its processor 622 and flush its processor cache 624 to non-volatile memory 640, as described above in relation to instructions 250 of FIG. 2.

Each node 620 may also determine if an incoming node failure notification has been received, as described above in relation to instructions 230 of FIG. 2. Based (at least in part) on the determination that the incoming node failure notification has been received, the each node 620 may freeze execution of all processes on its processor 622 and flush its processor cache 624 to non-volatile memory 640, as described above in relation to instructions 235 of FIG. 2.

In some examples, system 600 may comprise a data center including hundreds of nodes 620 within multi-node cluster 610. In some such examples, nodes 620 of multi-node cluster 610 may share several tens or even hundreds of Petabytes (PB) of fabric-attached non-volatile memory. Each node, in such an example, may also include approximately 40 Megabytes (MB) of processor cache and 256 Gigabytes (GB) of local non-fabric attached volatile memory, such as DRAM, that is accessible via a memory channel.

In the example system 600, when a node 620 detects its own failure, node 620 may send an outgoing node failure notification and each node within multi-node cluster 620 may receive an incoming node failure notification within a millisecond. Similarly, a system failure notification may reach each node 620 within a millisecond of cluster management interface 630 detecting that a system critical alert 650 has been triggered. Accordingly, assuming system 600 has one hundred nodes 620, each having a memory channel throughput speed of approximately 100 GB/s and a memory fabric throughput speed of approximately 10 GB/s, all 4 GB of processor cache (system-wide) may be flushed to non-volatile memory 640 within 40 milliseconds of a node 620 determining a failure (either its own failure or the failure of another node within the multi-node cluster) or of cluster management interface 630 determining that a system critical alert 650 has been triggered. Similarly, all 25 GB of local volatile memory 626 (system-wide) may be flushed to non-volatile memory 640 within 30 seconds of a node 620 determining a failure (either its own failure or the failure of another node within the multi-node cluster) or of cluster management interface 630 determining that a system critical alert 650 has been triggered.

In other examples, system 600 may have more or less non-volatile memory 640 and more or less nodes 620, having larger or smaller processor caches 624 and local volatile memories 626. System 600 may also have faster or slower memory channel and memory fabric throughputs, allowing for faster or slower flushing of all cache and volatile memory to non-volatile memory.

What is claimed is:

1. A system comprising:
   a non-volatile memory;
   a cluster management interface to monitor a system critical alert to determine if the system critical alert has been triggered, and based on a determination that the system critical alert has been triggered, multicast a system failure notification to a multicast address;
   a multi-node cluster comprising multiple nodes that are part of a multicast group associated with the multicast address, wherein the multiple nodes are connected to the non-volatile memory, and wherein each respective node of the multiple nodes includes a processor and a processor cache, and is to:
      determine if the system failure notification multicast by the cluster management interface to the multicast address has been received by the respective node,
      in response to determining that the system failure notification has been received from the cluster management interface,
         freeze execution of processes on the processor of the respective node, and
         flush data in the processor cache of the respective node to the non-volatile memory.

2. The system of claim 1, wherein a first node of the multiple nodes further is to:
   determine if the first node is in failure; and
   in response to determining that the first node is in failure, multicast a node failure notification to the multicast address,
   freeze processes on the first node, and
   flush data in the processor cache of the first node to the non-volatile memory.

3. The system of claim 2, wherein a second node of the multiple nodes further is to:
   in response to receiving the node failure notification multicast by the first node, freeze processes on the second node and flush data in the processor cache of the second node to the non-volatile memory.

4. The system of claim 1, wherein the cluster management interface is to monitor the system critical alert by:
   monitoring for a non-maskable interrupt (NMI) to determine if the NMI has been triggered.

5. The system of claim 1, wherein the non-volatile memory is a fabric attached memory.

6. The system of claim 5, wherein each node of the multiple nodes further includes a local, volatile, non-fabric attached memory comprising the processor cache.

7. The system of claim 1, wherein the processor of each node of the multiple nodes and the non-volatile memory receive power via separate power sources.

8. The system of claim 1, wherein the cluster management interface is to monitor the system critical alert by monitoring for an outage alert to determine if there is an outage, wherein the outage alert is one of a power failure alert and a disaster alert.

9. The system of claim 1, wherein the non-volatile memory is connected over a fabric to the multiple nodes.

10. The system of claim 1, wherein a first node of the multiple nodes is a processing device.

11. The system of claim 1, wherein a first node of the multiple nodes is a networking device.

12. An article comprising at least one non-transitory machine-readable storage medium comprising instructions executable on a processor of a first node of a multi-node cluster of nodes to:
    determine if an incoming node failure notification has been received, wherein the incoming node failure notification was multicast by a second node of the multi-node cluster to a multicast address and indicates that the second node is in failure, the multicast address associated with a multicast group of nodes that are part of the multi-node cluster;
    in response to determining that the incoming node failure notification has been received, freeze execution of processes on the processor and flush a cache on the first node to a non-volatile memory;
    determine if the first node is in failure; and
    in response to determining that the first node is in failure:
       generate an outgoing node failure notification, and
       multicast the outgoing node failure notification to the multicast address.

13. The article of claim 12, further comprising instructions executable on the processor of the first node to:
    in response to determining that the first node is in failure, freeze execution of processes on the processor, and flush the cache to the non-volatile memory.

14. The article of claim 12, further comprising instructions executable on the processor of the first node to:
    determine if a system failure notification has been received from a cluster management interface, wherein the system failure notification indicates that a system critical alert has been triggered;

in response to determining that the system failure notification has been received, freeze processes on the processor and flush the cache to the non-volatile memory.

15. The article of claim 12, wherein the incoming node failure notification was multicast by the second node responsive to detecting, by the second node, the failure of the second node.

16. A method of a first node of a multi-node cluster of nodes, the method comprising:
    determining if an incoming node failure notification has been received from a second node of the multi-node cluster, wherein the incoming node failure notification was multicast by the second node to a multicast address and indicates that the second node is in failure, the multicast address associated with a multicast group of nodes that are part of the multi-node cluster;
    in response to receiving the incoming node failure notification multicast by the second node to the multicast address:
        freezing execution of processes on a processor on the first node, and
        flushing a cache on the first node to a non-volatile memory,
    determining if the first node is in failure; and
    in response to determining that the first node is in failure, generating an outgoing node failure notification, and multicasting the outgoing node failure notification to the multicast address.

17. The method of claim 16, wherein the non-volatile memory is a fabric attached memory separate from the nodes of the multi-node cluster.

18. The method of claim 17,
    wherein the cache comprises a local, volatile, non-fabric attached memory on the first node.

19. The method of claim 16, wherein the incoming node failure notification was multicast by the second node responsive to detecting, by the second node, the failure of the second node.

* * * * *